US007270265B2

(12) United States Patent
Remery et al.

(10) Patent No.: US 7,270,265 B2
(45) Date of Patent: Sep. 18, 2007

(54) PROCESS FOR MANAGING AN ELECTRONIC TRANSACTION BY CHIP CARD TERMINAL AND CHIP CARD IMPLEMENTING THIS PROCESS

(75) Inventors: Patrick Remery, Caen (FR); Aymeric De Solages, Caen (FR); Bernard Darbour, Caen (FR)

(73) Assignee: France Telecom, Paris (FR)

( * ) Notice: Subject to any disclaimer, the term of this patent is extended or adjusted under 35 U.S.C. 154(b) by 55 days.

(21) Appl. No.: 11/064,052

(22) Filed: Feb. 22, 2005

(65) Prior Publication Data
US 2005/0161503 A1    Jul. 28, 2005

Related U.S. Application Data

(63) Continuation-in-part of application No. 09/787,503, filed on Mar. 16, 2001, now abandoned.

(51) Int. Cl.
*G06K 5/00* (2006.01)
(52) U.S. Cl. .................. 235/380; 235/375; 235/487
(58) Field of Classification Search ............... 235/380, 235/487, 375; 705/26, 67, 44; 380/229, 380/232
See application file for complete search history.

(56) References Cited

U.S. PATENT DOCUMENTS

| | | | |
|---|---|---|---|
| 5,793,027 A | | 8/1998 | Baik |
| 5,825,882 A | * | 10/1998 | Kowalski et al. ........... 713/172 |
| 5,930,363 A | * | 7/1999 | Stanford et al. .............. 705/65 |
| 6,016,955 A | * | 1/2000 | De Rooij et al. ............ 235/379 |
| 6,611,819 B1 | * | 8/2003 | Oneda .......................... 705/41 |

(Continued)

FOREIGN PATENT DOCUMENTS

EP    0 203 542    12/1986

(Continued)

OTHER PUBLICATIONS

Wenninger, John et al., "The Elecronic Purse", Current Issues in Economics and Finance, Apr. 1995, vol. 1, No. 1, Research and Market Analysis Group of the Federal Reserve Bank of New York, N.Y.

(Continued)

*Primary Examiner*—Thien M. Le
*Assistant Examiner*—Edwyn Labaze
(74) *Attorney, Agent, or Firm*—Cohen Pontani Lieberman & Pavane LLP

(57) ABSTRACT

A process for managing an electronic transaction with a trader by use of a microprocessor chip card and of a reading terminal able to interact with the card. The card performs a first comparison where it compares a transaction amount with a first threshold value and instigates a bearer authentication procedure when this amount is above the first threshold. When the amount of the transaction is below the first threshold, the chip card performs a second comparison where it compares with a second threshold value an incremented value of a first counter. The first counter being an aggregate of small amounts counter and being successively incremented by values of amounts of transaction in cases where the amounts are below the first threshold. A procedure for authenticating the bearer of the card is instigated by the card depending on the result of this second comparison.

16 Claims, 2 Drawing Sheets

U.S. PATENT DOCUMENTS

| | | | |
|---|---|---|---|
| 6,722,573 B2* | 4/2004 | Haddad et al. | 235/492 |
| 2002/0076051 A1* | 6/2002 | Nii | 380/232 |
| 2002/0162885 A1* | 11/2002 | Himmel et al. | 235/380 |

FOREIGN PATENT DOCUMENTS

| | | | |
|---|---|---|---|
| EP | 0 232 058 A | 8/1987 | |
| EP | 0 440 549 A | 8/1991 | |
| EP | 0 829 830 A | 3/1998 | |
| FR | 2 589 268 A | 4/1987 | |

OTHER PUBLICATIONS

Allen, C. et al., "SmartCards: Seizing Strategic Business Opportunities", 1999, McGraw Hill, p. 52.

* cited by examiner

PROCESS FOR MANAGING AN ELECTRONIC TRANSACTION BY CHIP CARD TERMINAL AND CHIP CARD IMPLEMENTING THIS PROCESS

This application is a continuation-in-part of U.S. patent application Ser. No. 09/787,503, filed Mar. 16, 2001 now abandoned which is a U.S. National Phase application of International Application No. PCT/FR99/02214, filed Sep. 17, 1999.

BACKGROUND OF THE INVENTION

FIELD OF THE INVENTION

The present invention relates to electronic transactions carried out by means of a chip card. It proposes a process for managing such an electronic transaction, as well as a terminal and a chip card implementing this process.

Customarily, during a transaction with a chip card, it is the reading terminal into which the chip card is inserted which manages the procedure for authenticating the card and the bearer thereof, as well as the procedure for validating the transaction.

In particular, the terminal of the reading terminal routinely requests the bearer of the card to indicate thereto his/her authentication code. Also, if the amount of the transaction exceeds a certain threshold, the reading terminal can decide to interrogate an external authorization center.

However, it is henceforth desired to be able to carry out very fast electronic transactions which can take place within very short times—for example less than 100 ms—and for which bearer authentication is not realizable.

Nowadays, fast electronic transactions are made possible by so-called "electronic purse" systems. An electronic purse is a device which comprises a memory in which is stored a value corresponding to a monetary sum which is decremented as and when transactions are made by means of said purse. However, electronic purses have drawbacks. In particular, they do not ensure the same security of transaction as bank cards. In particular, with an electronic purse it may happen that the latter registers a debit although the transaction at the level of the reading terminal is not taken into account.

With a bank card, the following takes place for a transaction. First an initialization phase takes place when the reading terminal consults the card in order to obtain its properties. Depending on the information received, the terminal decides whether or not it can carry out the transaction. If the card is a card accepted by the terminal, the terminal can request authorization from the bank, which either grants or does not grant authorization by emitting a certificate it has calculated to the destined terminal. If this is a refusal, the transaction is abandoned.

The terminal then transmits information about the transaction (amount, date, etc.) to the card, which stores it. The card systematically asks the holder for his or her personal code and checks the entered code with the one in its memory. If the entered code is wrong, the card can ask for another try. After several unsuccessful entries (e.g., 3), the card is blocked (it refuses the transaction and all the following ones). If the entered code is correct, the transaction continues. At this moment, the card requests authorization (if the terminal has not already asked) and checks the certificate received from the bank via the terminal. It the received certificate is not correct, the transaction is abandoned. The card transmits the signed data concerning the transaction.

The terminal stores the information about the transaction and sends the data back to the bank.

In order to use an electronic purse, the electronic purse must have been credited with a certain sum S during a so-called recharge phase. This process is carried out from a terminal. This downloading is similar to a bank card transaction. The following steps are required with an electronic purse. Initialization takes place (identical to that for a purchase with a bank card). If the card is identified correctly, the terminal sends the amount M to the card. If M>balance S on the electronic purse, the card refuses the transaction. If M<=S, the card calculates its new balance S=S–M and gives its acceptance for the debit by sending the signed data about the transaction. The terminal stores the information about the transaction and then sends it on to the bank.

SUMMARY

An aim of the invention is to propose a process for managing an electronic transaction which makes it possible to carry out transactions as speedily as with an electronic purse, but with security similar to that made possible by the currently known protocols for transactions by bank card.

The solution according to the invention consists of a process for managing an electronic transaction by means of a bank card of the microprocessor chip type and of a reading terminal able to talk to said card, in which the reading terminal sends a signal to said card which indicates thereto the amount of the transaction and in which said card compares this amount with a threshold transaction amount value and instigates a bearer authentication procedure when this amount is above said threshold, characterized in that, when this amount is below said threshold, said chip card compares with a threshold value the value of a counter, the so-called aggregate of small amounts counter, which value it increments by the value of the amount of the transaction and in that a procedure for authenticating the bearer of the card is instigated by said card as a function of the result of this comparison.

Thus, a card bearer benefits together with his bank card from a service which as far as he is concerned is akin to that of an electronic purse, but which is more secure, since it uses the existing infrastructure in respect of bank cards. Furthermore, the traditional reloading function is eliminated therefrom, thereby conferring greater convenience on the use of the card.

This process is advantageously supplemented by the various following characteristics taken alone or according to all their technically possible combinations: the value of the counter is replaced with said incremented value when the value of the amount of the transaction is below the threshold transaction amount value;—the value of the aggregate of small amounts counter is replaced with said incremented value when, as a function of the result of the comparison, the card bearer authentication procedure is not instigated by said card;

when the card bearer's identification code has been verified, the card increments by the value of the amount of the transaction, the sum of the counter of small amounts and of a second counter, it compares the incremented sum with a threshold value and instigates the interrogation by the reading terminal of an authorization center as a function of the result of this comparison, said card resetting the two counters to zero when authorization is given by said center, the value of the second counter being replaced with the value of the incremented sum, if as a function of the result of the comparison, the card decides not to request the reading terminal to interrogate the authorization center, the value of the counter of small amounts then being reset to zero;

the incrementation implemented by the chip card is a positive incrementation;

the incrementation implemented by the chip card is a negative incrementation.

The invention also relates to a microprocessor chip card intended to be used to carry out electronic transactions, characterized in that it comprises means for implementing the aforesaid process. Advantageously, this chip card comprises memory means for storing one or more threshold values and/or counter values, as well as means of comparison.

The invention also relates to a terminal for reading microprocessor chip cards, intended to be used to carry out electronic transactions, characterized in that it comprises means for implementing the aforesaid process.

BRIEF DESCRIPTION OF THE DRAWINGS

Other characteristics and advantages of the invention will become further apparent from the description which follows of several modes of implementation of the invention. This description is purely illustrative and non-limiting. It must therefore be read in conjunction with the appended drawings in which.

DETAILED DESCRIPTION

Figure 1:
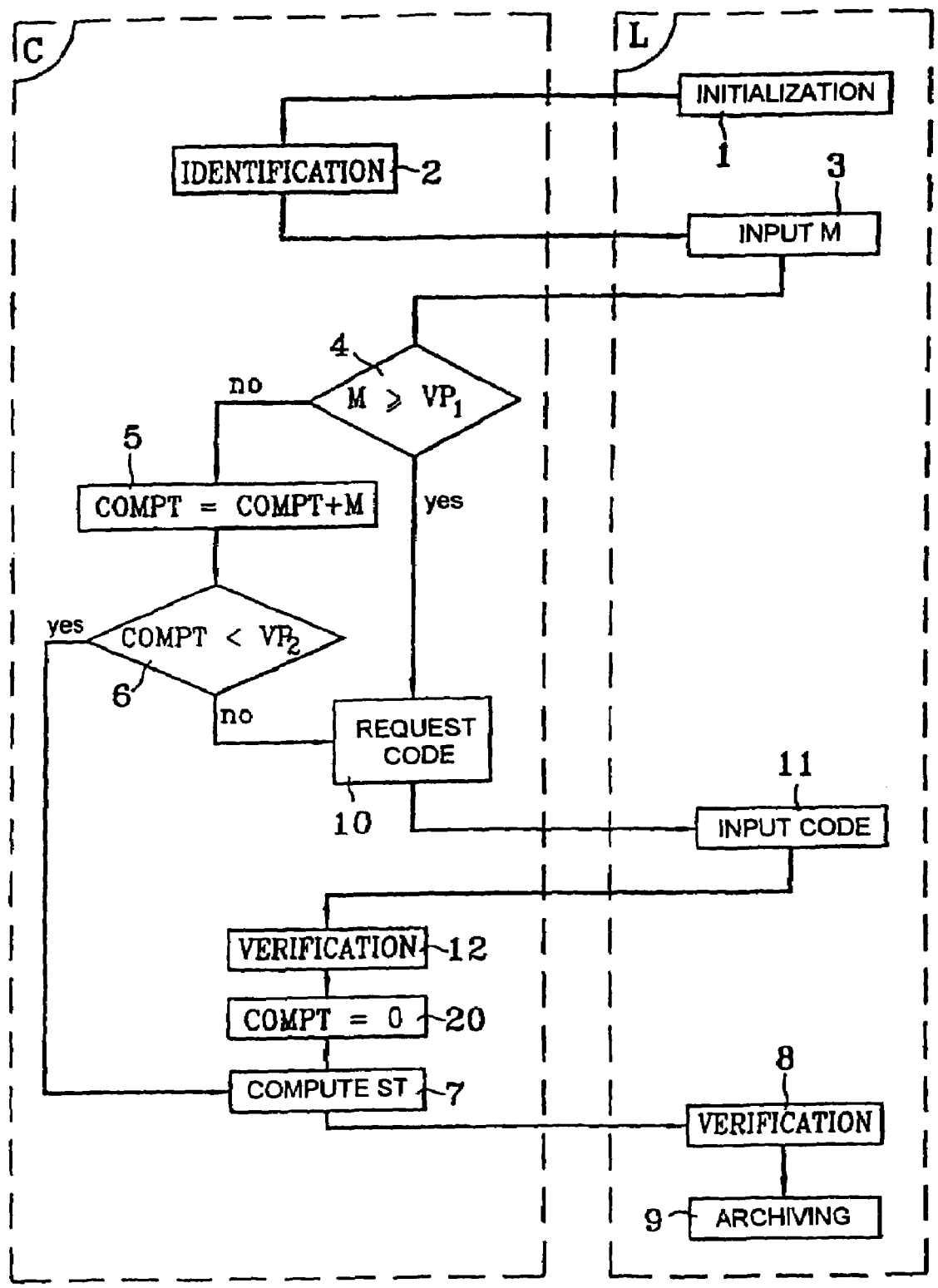
FIG. 1 is a flow chart illustrating a possible mode of implementation in respect of the process proposed by the invention.
Figure 2:
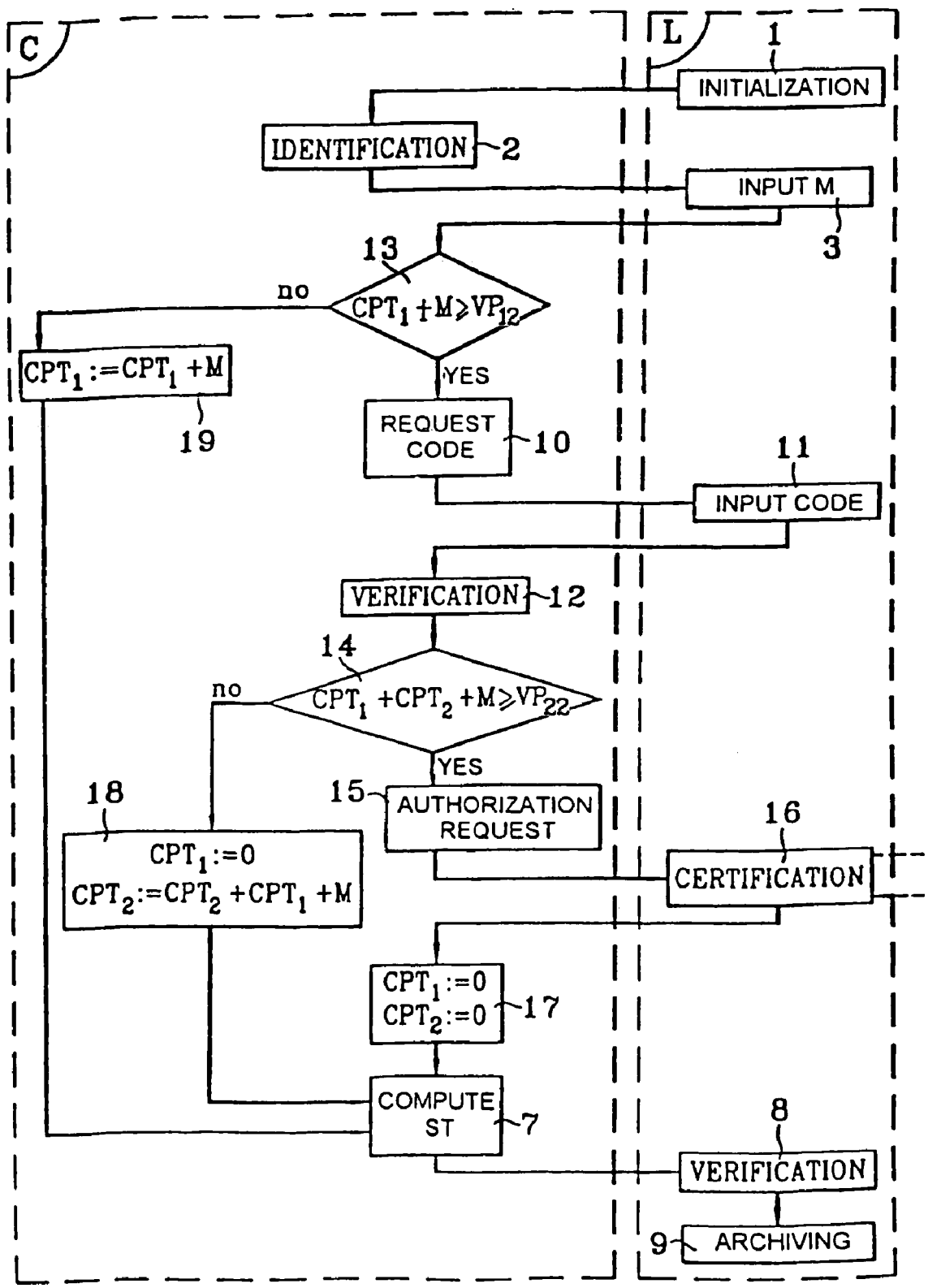
FIG. 2 is a flow chart illustrating another possible mode of implementation.

The various steps of the management processes illustrated in FIGS. 1 and 2 are implemented during an electronic transaction carried out by means of a bank type chip card.

This chip card comprises a microprocessor which is programmed in such a way as to implement a protocol which corresponds to these various steps, as well as ROM, EPROM, EEPROM or RAN memories in which are stored the various values calculated or taken into account during these various steps (amount of the transaction, values of counter(s), ceiling(s), etc.).

The reading terminal is programmed to implement the same process, the chip card and said terminal comprising means allowing them to talk to each other, these means possibly being of any type (bus using connection tracks carried by the chip card, exchanges via RF transmission/reception, etc.).

In FIG. 1, the steps implemented by the chip card are depicted in the block referenced by C, those implemented by the reading terminal being depicted in the block referenced by L. The transaction begins with an initialization of the chip card instigated by the reading terminal (step 1). Initialization includes read commands enabling identification of the chip card.

The card, in response, sends its identification to the reading terminal (step 2). An identifier amount is stored on the chip card. Next, the reading terminal requests the operator (i.e., retailer) to input the amount M of the transaction (step 3). It sends this amount M to the card. The latter implements a test 4 on the value of this amount M. If this amount M is below a ceiling value VP1, the card increments a counter COMPT by the value of this amount M (step 5).

The card then compares the value of this counter COMPT with a threshold VP2, which may be different from the threshold VP1. If the counter COMPT is below VP2, the microprocessor of the card calculates the signature ST of the transaction (step 7) and sends it to the reading terminal which verifies it and archives the amount of the transaction, as well as the details of the latter (steps 8 and 9). The signature includes VP1, VP12, VP22, CPT1, and CPT2. It should be noted that the signature can also include a transaction number, transaction amount (M), card number, date, time, etc.

If, conversely, the value of the counter COMPT is greater than VP2, the card requests the reading terminal for presentation of the bearer's code step 10). The bearer inputs his code (step 11). The code is sent by the reading terminal to the card which verifies it (step 12). The code can include a user code and/or a personal identification number (PIN). The bearer enters the code on the terminal keypad. Verification includes comparison of the entered code and a value stored on the chip card.

After verification, the microprocessor of the card resumes the processing and calculates the transaction signature ST (step 7) Between the verification step 12 and the computation step 7, the counter CONPT is reset to zero. Thus, the counter COMPT is reset to zero after each positive verification of the confidential code (step 20). The bearer's code is also requested by the card when the amount M is greater than the threshold value VP1 ("yes" response to test 4).

In this case, the bearer's code is verified and the amount M is not aggregated on the counter COMPT. The conventional steps of a bank card transaction are run. This includes the chip card records the transaction data, the terminal records the transaction data, a transaction receipt can optionally be printed, and the service is rendered to the bearer. Optionally, or as a variant, provision may be made for the card to request the connection of the reading terminal to the banking system so as to obtain a transaction authorization therefrom. This has advantages as the chip card will not produce the transaction data (i.e., the signature in particular) unless it obtains acceptance from the issuing bank. The chip card, being secured by the issuing bank, is controlled by the issuing bank without any possibility of avoiding the control.

With the transaction authorization, the reading terminal can, as a function of the information provided by the banking system, send the card an order to reupdate the ceilings VP1 and VP2. In the connection with the issuing bank for authorization, the issuing bank can choose, depending on its policy, to modify the upper limits VP1, VP12, VP22 set in the card. For example the issuing bank can make modifications a function of the number of transactions made by the card or the user bank account balance. Then the new data VP1, VP12, VP22 are transmitted in the reply to the authorization request. This is advantageous over purse cards and bank cards as transactions are simplified, secured and the conditions for carrying out the transaction are personalized. This is due to a function of the context, and through a secured and direct exchange between the card and the issuing bank. Here, the terminal simply transmits the information. As will have been understood, in the variant implementation just described with reference to FIG. 1, the payment card aggregates on the internal counter COMPT the amount of the transactions which are below a certain threshold and requests authentication of the bearer only when the amount M is above this threshold or when the aggregated sum of the earlier transactions becomes greater than a given threshold.

As a variant, provision may be made for the counter COMPT to be reset to zero only under the supposition that the value of the counter COMPT is verified to be above the threshold value VP2 in step 6 and that the code input is recognized as being correct by the card. Under this supposition, the counter COMPT is not reset to zero if, during step 4, the amount M is verified to be above the threshold value VP1. It is reset to zero only if the amount H is below the threshold value VP1 and if in step 6 the counter COMPT is verified to be above VP2 and if the verified code is correct.

Thus, the counter COMPT is reset to zero only when on the one hand the sum of the small amounts reaches the threshold VP2 and on the other hand the bearer is authenticated by his code. It should be noted that the "small amounts" can vary from country to country, from bank to bank, and can be dependent on the service (e.g., a proximity payment, on-line payment). For example, in France for a proximity payment, the small amount can be 10 euros, and 1 euro for an on-line payment. Again as a variant, the card can be used to carry out an incremental payment, for example in the case of a communication from a public telephone kiosk. In this case, an increment loop is added between steps 7 and 3, and the signature ST is as a function of the sum incremented ($\Sigma M$) at the end of the communication, $\Sigma M$ being reset to zero in the card on completion of the identification step 2.

Thus, at the end of the communication only a single transfer order ST is retained, containing the sum of the charges levied; the user pays as a function of the duration of the communication and as and when the charges are levied. Another variant implementation is illustrated in FIG. 2. This second variant consists in managing a second counter CPT2 in the card accumulating the aggregates performed on a first counter CPT1 of small amounts. If the value of the counter CPT2 reaches a ceiling value VP22, defined by the bank and registered previously in the card, the card will demand the checking of a certificate calculated by an authorization center. The issuing bank determines the ceiling value VP22. Therefore, the bank determines when an authorization request is obligatory. In one embodiment the card contains instructions that require the card to receive a certificate calculated by the issuing bank. These instructions will check the certificate before continuing the transaction. This certificate is indispensable to secure the reply from the issuing bank. It is the triggering of the procedure when the VP22 threshold is reached.

The procedure is as follows: The card adds the amount M of the transaction to the value read from CPT1. If (test 13) the sum CPT1+M reaches a ceiling value, VP12, the card demands the checking of the bearer's confidential code (steps 10, 11 and 12). If the confidential code is correct, the card adds the value of CPT1+M to the value read from CPT2. The bank can set re-entry limits so that after the predetermined limit is reached, the card is then blocked. Once the card is blocked, the bearer must have the bank clear it for use.

The new value obtained is compared with a threshold VP22 (test 14). If the sum CPT1+M+CPT2 reaches the ceiling VP22, the card demands (step 15) the checking of a certificate computed by an authorization center interrogated by the terminal of the reading terminal L (step 16).

If the certificate is correct, the card resets the counters CPT1 and CPT2 to zero (step 17) and then computes and delivers the signature of the transaction (steps 7 et seq.). If the certificate is incorrect, the card does not deliver the signature of the transaction and leaves the values of the counters CPT1 and CPT2 unaltered. As long as the sum CPT2 of amounts CPT1 is lower than the ceiling VP22 the card does not demand authorization from the issuing bank. These summed amounts are not prepaid balances since they are incremented according to use of the card. As long as the ceiling VP12 has not been reached the bearer's bank account is not debited. This is distinguishable over a purse card where the bearer's bank account is debited before use of the credit on the card, using a prior transaction in liaison with the bank (Recharge). When the limit VP12 is reached, the transaction is taken into account by the issuing bank and the bearer's bank account is debited by the amount of the sum CPT1.

If the sum of CPT1+M+CPT2 has not reached the ceiling value VP22, the card resets the counter CPT1 to zero and updates the counter CPT2 by replacing its previous value with CPT2+CPT1+M (step 18). Next it computes and delivers the signature of the transaction (steps 7, 8 and 9).

If the sum CPT1+M does not reach the ceiling value VP12, the card updates the counter CPT1 by replacing its previous value with the sum CPT1+M (step 19), and it then delivers the signature of the transaction (steps 7, 8 and 9).

The card just described can be used in postdebit mode. The amounts debited are aggregated, for example over 30 days at most, on the basis of bearer account number, and the bearer account is debited after the ceiling VP2, VP12 is exceeded or on completion of the 30 days of the value of the amounts aggregated since the last debit of the account. The amounts can be aggregated:

on the collection server after collection of the transactions stored on the trading terminals. In this case, the exceeding of the ceiling VP2, or VP12 triggers in the card via the terminal a request for authorization of amount equal to the new ceiling VP2, VP12 which can be redefined by the bank.

In the card itself. In this case, the exceeding of the ceiling VP22, triggers in the card via the terminal a resetting of the aggregate and an authorization request. In this case it is necessary to have the customer pay a deposit when obtaining his card, to prevent the "deliberate" theft or loss of his card (thus avoiding the debiting of the aggregate). This deposit can be disguised, that is to say included within the annual subscription of the card. Therefore, beyond the limit VP12, debit of the bearer's bank account is triggered. If VP12 is not exceeded after a given period, the residual amount on the card (CPT1') corresponds to a credit from the bank. After a given time delay (e.g., 30 days) the bank can debit the bearer's bank account, even if the limit VP12 has not been reached. When the card is re-used and the limit VP12 is reached, the bank deducts the residual amount (CPT1') already debited. The terminal stores all the transactions carried out. These transactions are collected at the end of the day. The collection center takes into account the transactions of amount M, calculates the sum for the terminal ($\Sigma M$) and credits the retailer's bank account. The bank no longer processes transactions for small amounts one by one, but processes the sum of the amounts, the one calculated by the bearer's card delivered by the issuing bank and the one from the terminal calculated by the retailer's collection center. This is distinguishable over bank cards and purse cards by reducing the cost of processing bank debit transactions by reducing processing of transactions. The collection center can continually verify, according to time, all the transactions carried out using the equation:

$$\Sigma M = \Sigma CPT_1 + \Sigma M'' \text{(if } M \geq VP_1 \text{ then } M'':=M, \text{ otherwise } M'':=0)$$

The card can also be used in predebit mode. In this case, the value VP2, and for the variant of FIG. 2, the value VP12, is (or are) prepaid by the bearer and updated in the card, with the aid of the certificate received which is dependent on the amount prepaid by the user.

If the user should find himself on a terminal with no identification keypad or which is not connected to a telecommunication network, and should the prepaid value VP2, VP12 be reached, he will have to get onto a device of the bank (automatic teller machine—voucher dispenser or public telephone) so that the operations for checking the certificate issued by the authorization center can be carried out. The transaction in this case being fictitious, no amount being debited from the customer's account, except in the predebit application. Here, the upper limits are prepaid. When the sum reaches the upper limit, the card cannot be used. If the amount due plus the sum is greater than the upper limit, the card requests authorization via the retailer's terminal. The authorization request triggers the debit of the bearer's bank account. When the card receives authorization, the sum is returned to zero. If the requested authorization is not obtained, the transaction is abandoned. The bearer has to contact his or her Bank to obtain authorization.

Again as a variant, the card need not utilize the bearer authentication code. In this case, the comparison of the amount of the transaction with the threshold VP1 is not carried out and VP1 is not used. When the value COMPT stored in the card is greater than or equal to the threshold VP2, the card does not deliver the transaction signature ST.

A tolerance on VP2 is defined so as to accept the values of COMPT which are slightly greater than VP2 and thus allow the overstepping by COMPT of the value VP2 which disables the card. That is, as long as CPT1>VP12, the card will not accept the transaction.

The card can be discardable, when VP2 is reached, the card is no longer usable. However, in particular if the card is refundable, the bearer can return the card to the bank which with the aid of a secure procedure resets the value of COMPT to zero, before reintroducing it into a new usage cycle. Or else, the card can be enabled by the bank with the aid of a secure on-line procedure. In the course of this procedure the bearer is authenticated, for example, with the aid of a second payment card or a code verified by the server of the bank, and COMPT is reset to zero after verification by the card of a certificate computed by the bank.

In the examples above, the counters CPT1 and CPT2 are incremented from the value 0 to a ceiling value. It is also possible to count downwards, the counters being initialized to the ceiling value VP1 and VP2 and then decremented down to the value 0, the counting can also be done on negative values etc. The ceilings VP12 and VP22 are set in the card by the issuing bank. These ceilings intervene during a payment transaction, even if this transaction is being made without a connection to the bank. This is important for transactions of small amounts carried out on cash dispensers in general without a telephone link.

As will have been understood, with the management process proposed by the invention, the aggregated amount is compared, not with an amount previously reloaded into the card, but with a maximum value fixed as a function of the risk which the issuer of the card is prepared to take. This comparison is a means of limiting the customer's expenses over time, and this is one of the roles of the card, in addition to authentication. The maximum value chosen can be regarded as a kind of permanent credit granted to solvent customers, the bank being remunerated for example by virtue of a commission on transactions.

The small transactions are submitted: either individually by the trader, like normal-amount transactions, using the banking infrastructure. The only function of the customer aggregate in the card is then to limit the customer's expenses (moderator role); or with a trader aggregating option, which assumes that the customer aggregate is also submitted (by the card, in the course of a transaction) to the bank for invoicing. This option obviously does not allow the same checks as the first. A management of credit in the card can be as follows: to be valid a transaction must be signed by the card. The card has calculation resources enabling it, in particular, to execute a cryptographic algorithm such as Data Encryption Standard (DES) or the RSA algorithm (Ronald L. Rivest, Adi Shamir, Len Adelman, "On Digital Signatures and Public Key Cryptosystems," MIT Laboratory for Computer Science Technical Memorandum 82 (April 1977)). The card can thus calculate a signature on transaction data such as the amount, the card number, etc., by executing a cryptographic algorithm programmed in its memory.

The signature ST1, printed on the customer slip, serves to resolve any disputes. The data of a transaction are stored in the terminal's submission file and then collected once a day by the trader's bank collection center. The transactions of small amounts are sent to the bearer's bank and are not processed individually by the latter: they are stored to allow the auditing of the system, to resolve any disputes and to settle with the trading bank.

The trader's bank account is credited in accordance with the aggregate of the small amounts collected in the terminal daily. The amount of a transaction is aggregated in the credit counter of the card. The card verifies the value of the credit counter and the duration of the credit.

Examples of transactions processed by the card are given in the following tables.

TABLE I

The credit counter of the card has reached the ceiling value fixed by the bank. The data of the table are managed in the card. The table data, amount of the transaction, credit counter, date of the transaction ceiling fixed by the bank, maximum duration of credit are all stored in the card. The date of the transaction, the amount of the transaction are provided to the card by the terminal.

| Transaction number | Amount of the transaction | Counter of credits | Date of the transation | Ceiling fixed by the bank | Maximum duration of the credit |
|---|---|---|---|---|---|
| 1 | 10 | 10 | Aug. 02, 1999 | 100 | 1 month |
| 2 | 20 | 30 | Aug. 03, 1999 | 100 | |
| 3 | 40 | 70 | Aug. 05, 1999 | 100 | |
| 4 | 20 | 90 | Aug. 05, 1999 | 100 | |
| 5 | 30 | 120 0 | Aug. 07, 1999 | 100 | |

TABLE II

The maximum duration of credit of the card is reached.

| Transaction Number | Amount of the transaction | Counter of credits | Date of the transaction | Ceiling fixed by the bank | Maximum duration of the credit |
|---|---|---|---|---|---|
| 1 | 10 | 10 | Aug. 02, 1999 | 100 | 1 month |
| 2 | 20 | 30 | Aug. 10, 1999 | 100 | |
| 3 | 15 | 45 | Aug. 15, 1999 | 100 | |
| 4 | 20 | 65 | Aug. 25, 1999 | 100 | |
| 5 | 0 | 70 0 | Sep. 03, 1999 | 100 | |

The transaction process proposed by the invention has numerous advantages:

the security is that of the bank card since the debits are verified a posteriori by the bearer, the trader and the bank. Therefore, unlike an electronic purse, the bearer bank account is not debited before the transactions are carried out with retailers, but afterwards;

the payment with debit/credit card can be made on a contactless card since there is no longer any routine inputting of the confidential code and moreover, should the contactless exchanges be interrupted, the transaction can easily be canceled. Unlike the electronic purse where the debit reduces the balance loaded in the card, the chip card possesses no credit so that if the transaction has not been able to be totally completed it is easier to cancel the transaction. Payments can be made between a card and a payment terminal (POS) not only by using the electrical interface of the card contacts, but by using the radio frequency interface (RFID: Radio Frequency Identification) between the antenna of the card and the antenna of the terminal. Routine inputting: the interest of contactless cards is to reduce transaction time. Systematic verification of the personal code lengthens this time. Systematic non-control, makes it possible to have shorter transaction times;

the bank card network is not modified and there is the possibility of reusing the server for accumulating the amounts of payphone transactions over a month by bank card. That is, the card is not recharged, and distinguishable from an electronic purse, the card does not require supplementary infrastructure for refilling the electronic purse;

it is no longer possible to deceive the terminal regarding the response to the verification of the bearer code, since the transaction will only be continued if the bearer code is correct.

What is claimed is:

1. A process for managing an electronic transaction with a trader by means of a bank card of the category with a microprocessor chip and of a reading terminal able to interact with said card, in which the reading terminal sends a signal to said card which indicates thereto an amount of the transaction and in which said card performs a first comparison where the chip card compares this amount with a first threshold value and instigates a bearer authentication procedure when this amount is above said first threshold, wherein, when the amount of the transaction is below said first threshold, said chip card performs a second comparison where the chip card compares with a second threshold value an incremented value of a first counter, said first counter being an aggregate of small amounts counter and being successively incremented by values of amounts of transaction in cases where said amounts are below said first threshold, said incremented value corresponding to the previous value of said first counter, incremented by the value of the amount of transaction, and wherein a procedure for authenticating the bearer of the card is instigated by said card depending on the result of this second comparison, wherein the first counter automatically stores said incremented value when the value of the amount of the transaction is below the first threshold, the amount thus incremented being submitted by the card to the bank for debit of the bearer's account when a procedure for authenticating the bearer of the card is instigated.

2. The process according to claim 1, wherein said first counter automatically stores said incremented value before the second comparison, said second comparison consisting in the comparison of the stored value of said first counter with said second threshold.

3. The process according to claim 1, wherein the first counter stores said incremented value after the second comparison.

4. The process according to claim 1, wherein a procedure for authenticating the bearer of the card is instigated during which the card bearer's identification code is verified and wherein when the card bearer's identification code has been verified, the card performs a third comparison wherein the chip card compares with a third threshold value the incremented value of a second counter, which incremented by the incremented value of the first counter and wherein the card instigates the interrogation by the reading terminal of an authorization center depending on the result of this third comparison.

5. The process according to claim 4, wherein said card resets the first and the second counters to zero when authorization is given by said center.

6. The process according to claim 4, wherein the second counter stores the incremented value if, depending on the result of the third comparison, the card decides not to request the reading terminal to interrogate the authorization center, the value of the first counter being then reset to zero.

7. The process according to claim 4, wherein the incrementation implemented by the chip card is a positive incrementation.

8. The process according to claim 4, wherein the incrementation implemented by the chip card is a negative incrementation.

9. The process according to claim 1, wherein the incrementation implemented by the chip card is a positive incrementation.

10. The process according to claim 1, wherein the incrementation implemented by the chip card is a negative incrementation.

11. The process according to claim 1, wherein, in case of an amount of transaction below said first threshold, the transaction data are stored in a submission file of the terminal and collected once a day by a collection center, the trader's bank account being credited in accordance with the aggregate of amounts below said first threshold thus collected.

12. The process according to claim 1, further comprising storing transaction amount, credit counter, date of transaction, first threshold, maximum duration of credit in the chip card.

13. A microprocessor chip card for carrying out electronic transactions, said microprocessor chip card comprising means for performing a first comparison where said chip card compares this amount with a first threshold value and instigates a bearer authentication procedure when this amount is above said first threshold, means for performing a second comparison, said second comparison is performed when the amount of the transaction is below said first threshold, said second comparison compares with a second threshold value an incremented value of a first counter, said first counter being an aggregate of small amounts counter and being successively incremented by values of amounts of transaction in cases where said amounts are below said first threshold, said incremented value corresponding to the previous value of said first counter, incremented by the value of the amount of transaction, and means for instigating a procedure for authenticating the bearer of the card depending on the result of this second comparison, said chip card further comprising memory means for storing one of one or more threshold values and counter values and one or more counter values, as well as means of comparison, means for submitting to the bank the amount thus incremented for debit of the bearer's account when a procedure for authenticating the bearer of the card is instigated.

14. The microprocessor chip card according to claim 13, wherein transaction amount, counter values, date of transaction, first threshold value and maximum duration of credit are stored in the microprocessor chip card.

15. A terminal for reading microprocessor chip cards, for carrying out electronic transactions, wherein said terminal comprises means for sending a signal to a microprocessor chip card, said signal indicating an amount of a transaction, wherein based on said signal, said chip card performs a first comparison where said chip card compares the transaction amount with a first threshold value and instigates a bearer authentication procedure when this amount is above said first threshold, performs a second comparison when the amount of the transaction is below said first threshold, said second comparison compares with a second threshold value an incremented value of a first counter, said first counter being an aggregate of small amounts counter and being successively incremented by values of amounts of transaction in cases where said amounts are below said first threshold, said incremented value corresponding to the previous value of said first counter, incremented by the value of the amount of transaction, and instigates a procedure for authenticating the bearer of the card depending on the result of this second comparison.

16. The terminal for reading microprocessor chip cards of claim 15, wherein transaction amount, counter data, date of transaction, first threshold and maximum duration of credit are stored in the chip card.

* * * * *